H. E. SESSIONS.
COTTON SEED LINTER.
APPLICATION FILED DEC. 12, 1908.
962,722.
Patented June 28, 1910.
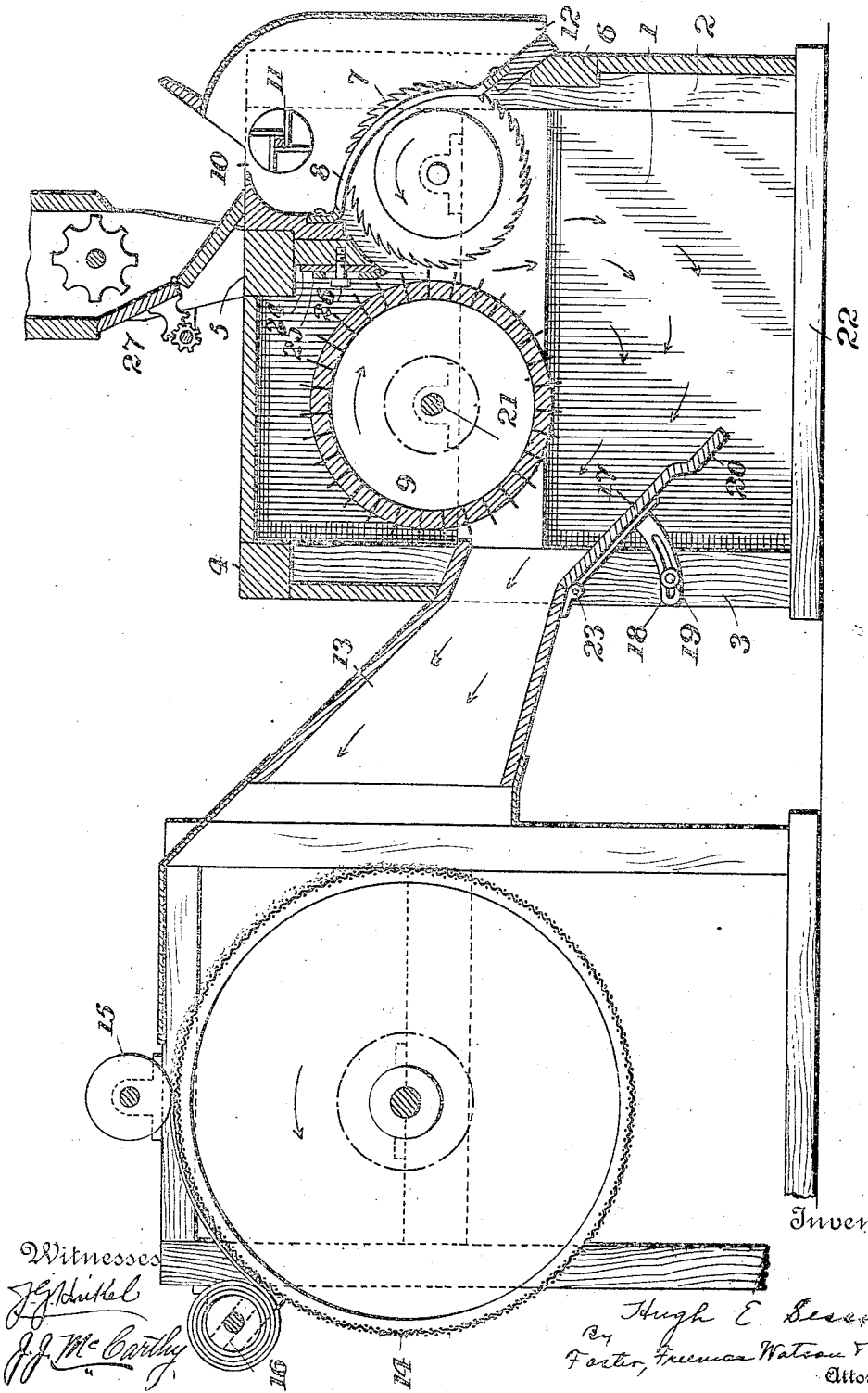

UNITED STATES PATENT OFFICE.

HUGH E. SESSIONS, OF COLUMBIA, SOUTH CAROLINA.

COTTON-SEED LINTER.

962,722.

Specification of Letters Patent. Patented June 28, 1910.

Application filed December 12, 1908. Serial No. 467,217.

*To all whom it may concern:*

Be it known that I, HUGH E. SESSIONS, a citizen of the United States, and resident of Columbia, in the county of Richland and State of South Carolina, have invented certain new and useful Improvements in Cotton-Seed Linters, of which the following is a specification.

This invention relates to machines for removing from cotton seed the lint which adheres to them after most of the lint has been removed by being passed through the ordinary cotton gin. Its objects are to simplify and improve the construction and to secure an operation which will more efficiently separate the lint from motes and other trash, and thereby produce commercial lint of a much higher grade or quality than has been done with machines in common use.

The novel features and advantages of the invention will be apparent from the following description taken in connection with the accompanying drawing.

In the drawing I have shown a section of a delinting machine embodying my invention.

The means for removing the lint from the seed is embodied in a casing 1 having the upright corner posts 2 and 3 and the cross pieces 4, 5 and 6. In this casing a saw cylinder 7 is mounted embodying a gang of saws passing between the saw ribs 8 as will be clearly understood by those skilled in the art. A brush cylinder 9 is mounted by the side of the saw cylinder having brush points engaging the teeth of the saw and adapted to rotate at a higher rate of speed than the saw cylinder. The two cylinders rotate in the direction indicated by the arrows, and because of the higher rate of speed of the brush cylinder the cotton is brushed from the teeth of the saws down toward the floor or platform on which the casing 1 is mounted. Preferably the ends of the brush should just touch the points of the saw teeth, the lint being drawn from the saws principally by the draft created by the brush. The cotton seeds are fed to the apparatus through the opening 10 in any suitable way, and the amount fed to the saws is regulated by the feed mechanism 27. The float 11 agitates the seed and assists in properly presenting them to the saws. It will be understood that the lint is carried by the saw teeth between the ribs 8 until it reaches the brush and that the seed pass down the ribs and out through the opening 12.

A flue 13 leads upwardly from the lower edge of the brush cylinder 9 and discharges the lint upon a cylinder 14 covered with wire cloth which revolves in the direction indicated by the arrow. The lint is deposited on the cylinder 14 in the form of a layer which passes beneath the roller 15 and which is wound upon the roller 16. It will be understood that the draft which carries the lint up through the flue 13 is created by the brush cylinder 9 which rotates at high speed immediately above the entrance of that flue.

There is nothing essentially novel in the features of the apparatus so far described, the main features of my invention residing in the means which I use for regulating and controlling the passage of the lint up to and through the flue 13 and for securing an efficient separation of trash from the lint before it passes into that flue. In its preferred form my invention resides in the mote board 17 constructed and arranged as shown.

In devices of this class mote boards have heretofore been used but those boards have been rather complicated made up of separable sections and have been made to pass in close proximity to the bottom of the brush cylinder. They have usually been made to extend considerably beyond the center line of the brush cylinder, so as to secure in effect an inlet opening for the flue immediately adjacent the point where the lint is brushed from the saw cylinder. In the ordinary construction, the mote board has been placed about one and one-half to two inches from the brush cylinder, and the lint which is brushed downwardly from the saws has been drawn by the strong suction directly on to the top of the mote board and has been thus carried out through the lint flue to the perforated drum. Some of the heavier particles of trash and some of the motes would in this construction not be drawn in above the mote board, but would pass down to the floor, but some of the motes and a great many particles of trash, including some small seed that pass through the ribs would be drawn in and carried off with the lint, thus producing a product of very low grade. The workers in this art have recognized the defect in the operation of devices having mote boards arranged as above described, but it has been supposed that this arrangement was necessary in order to make the lint pass outward through the flue to the perforated drum, and it has been supposed that to do away with this narrow flue between the brush and the mote board would result in allowing most of the lint to fall to the floor of the machine with the heavy particles of trash, and that consequently most of the lint would be wasted.

By my experiments I have discovered that a shorter mote board may be used than has been thought possible, and that the best results are secured when it is arranged in such position and at such an angle as to leave a wide space between it and the brush cylinder. I find that good results are secured by a mote board placed at an angle of about 45°, the shortest distance between it and the brush cylinder being about nine inches, instead of about one and one-half to two inches, as heretofore. This board, furthermore, preferably does not extend beyond the central line of the brush cylinder, but terminates upon the side of that cylinder opposite to the saw cylinder. I find that by this construction and arrangement the lint is brushed downward from the saws passing first, directly toward the floor, making a curve toward the mote board, and then rising up between that board and the brush cylinder 9. The motes and trash including small or faulty seed that sometimes pass through the ribs traveling with the lint but being heavier than the lint, I find will not rise and pass up over the mote board, but will pass on to the floor of the apparatus, thus effecting a complete and efficient separation of the lint and trash. I believe this efficient operation of my construction is due to the wide opening between the brush cylinder and mote board, and to the considerable distance between the end of the mote board and the vertical line on which the lint and trash would naturally fall to the floor. The brush cylinder creates a sufficient draft in the side opening to draw the lint up into the flue 13, but not sufficient to draw the heavier particles of trash.

I make my mote board 17 adjustable by means of the slotted arm 18 and screw 19, although I find little adjustment necessary after putting the board in place. I prefer to make the lower end of the mote board in the form of a downwardly offset section 20, since I find that this downward offset to the end of the mote board improves its operation, but this offset is not necessary to secure the beneficial effects of my invention, since a straight board may be used. I am unable to say why this arrangement of the end section 20 should increase the efficiency of the device, but I have found that in practice it does so, and it may be due to the fact that the end of the mote board is thereby placed at a greater distance from the brush cylinder 9.

The current of air which enters the chamber formed by the casing 1 below the mote board 17 is first directed in along the floor toward the point where the material is falling from the brush cylinder, and it then rises and passes out through the flue 13. The draft is just strong enough to overcome the tendency of the fine particles of lint to proceed on their way to the floor of the chamber, or in other words the upward current to which the falling lint is subjected has a velocity only slightly greater than the velocity at which the lint would normally fall. It follows from this that the lint is gradually arrested in its descent when it strikes the upwardly moving air current, and it then floats laterally and upwardly out through the flue 13. The motes and trash being heavier than the fine particles of lint naturally fall at a greater velocity through the air, and in the operation of my device arranged as described their velocity is greater than the velocity of the upwardly moving air. The result is that the motes continue on their course to the floor, and the lint free from trash and motes floats off separately. The wide space left between the brush cylinder and mote board in the particular embodiment which I have shown is what causes the gentle draft as described, since the suction is due to the rotation of the brush cylinder. The cylinder of course rotates very rapidly in order to brush the lint from the saws and would create a strong draft if the mote board were close to it. Lowering the mote board at an angle as shown not only leaves a wide space creating a gentle draft, but makes the air pass from the space occupied by the falling lint upwardly at an angle, thus drawing the lint upwardly as distinguished from sucking it laterally directly across its line of fall. In other words, the draft lifts the lint and carries it upward above the mote board instead of merely deflecting it laterally. The wide throat or entrance above the lower edge of the mote board allows the lint to be subjected to the gentle draft throughout a sufficient portion of its fall to gradually arrest its descent and carry it away. As shown in the drawing the casing is substantially closed up to the peripheral line of the saw cylinder so as to prevent side drafts affecting the very light falling lint, and in the construction shown the necessary air is admitted below the lower edge 20 of the mote board.

In order to give an accurate idea of the proportions of the parts I will say that I have embodied the invention in an actual machine having brush cylinder 9 sixteen inches in diameter, the shaft 21 of that cylinder being 27 inches from the floor on which rests the bottom piece 22 of the casing 1. The lower end of the mote board is about eight inches from the floor, and about eleven and three-quarter inches from the vertical line through its hinge 23. The lower end of the mote board is furthermore between one and two inches to the left of a vertical line passing through the shaft 21 of the brush cylinder and the hinge 23 is eighteen inches above the floor. It will be understood that I do not confine myself to these exact measurements and proportions, but they are given as one illustration which will make it easy for those skilled in the art to make and use the device carrying out the principle of my invention.

A division plate 24 is ordinarily used in devices of this kind secured indirectly to the top beam 5 and extending from above in between the saw cylinder and the brush cylinder. I have added to this division plate an additional division plate 25 provided with vertical slots through which pass screws 26. This plate is therefore vertically adjustable and may be made to approach at its lower end the edge of the brush cylinder and I find that its presence in the apparatus assists materially in the operation of the device when the mote board is arranged in accordance with my invention. This increase in the efficiency seems to be due to the fact that this division board has the effect of regulating the amount of draft down between the brush cylinder and the saw cylinder, and therefore regulates to a certain extent the force with which the lint is driven downward when it is brushed from the saws. I find that good results are secured when the lower edge of the board is about one-sixteenth of an inch from the ends of the bristles on the brush.

It will be understood that I do not wish to confine myself to the specific structure of the device shown, but claim the broad features of construction having the novel operation above indicated.

Having thus described the invention, what is claimed is:

1. In a device of the class described, the combination with a saw cylinder, of a brush cylinder adapted to brush the lint downwardly from said saw cylinder, and a mote board beneath said brush upon the side opposite the saw the said mote board being inclined downwardly at an angle of about forty-five degrees and its lower end being offset downwardly terminating approximately beneath the center line of the brush cylinder, and being widely separated therefrom.

2. In a device of the class described, the combination with a saw cylinder, of a brush cylinder adapted to discharge lint downwardly, a mote board widely separated therefrom arranged at an angle of about forty-five degrees, and a casing forming an unobstructed chamber to receive the downwardly directed lint so constructed as to admit air below said mote board but prevent side drafts up to the peripheral line of said saw cylinder.

3. In a device of the class described, the combination with a saw cylinder, of a brush cylinder, a mote board widely separated therefrom arranged at an angle of about forty-five degrees and having a downwardly offset end portion.

4. In a device of the class described, the combination with a saw cylinder, of a brush cylinder mounted by the side of said saw cylinder and adapted to brush the lint downwardly from said saw cylinder, an adjustable division board extending downwardly between said cylinders from above, and a mote board extending downwardly beneath the brush cylinder, but widely separated therefrom upon the side opposite the saw cylinder.

5. In a device of the class described, the combination with a saw cylinder, of a brush cylinder mounted by the side thereof with the ends of its bristles just touching the ends of the saw teeth, and an adjustable division board over the brush cylinder on the side next to the saw whereby said board may be made to approach the ends of the bristles thus regulating the draft, and an outlet flue for the lint having a large inlet opening below and upon the opposite side of the brush cylinder.

6. In a device of the class described, the combination with a casing, of a saw cylinder therein, a brush cylinder adapted to discharge the lint downwardly from said saw cylinder, the said casing forming an unobstructed chamber to receive said downwardly directed lint and adapted to prevent side drafts up to the peripheral line of said saw cylinder, a flue for the lint leading from said casing on the side next to said brush cylinder, a mote board extending downwardly beneath said brush and being so related thereto that the normal rotation of said brush will create a gentle draft in said flue, the parts being so arranged and proportioned that a large open space is left in advance of said mote board to receive the downwardly discharged lint.

7. In a cotton seed linter, the combination with a casing forming a substantially closed chamber, of a saw cylinder therein, a brush cylinder adapted to discharge lint downwardly from said saw cylinder, a flue for the lint leading from said casing on the side next to said brush cylinder, and a mote board widely separated from said brush cylinder extending downwardly at an angle from said flue to a point near the floor of the casing beneath the brush cylinder leaving a narrow inlet for air beneath the edge of said mote board.

8. In a cotton seed linter, the combination with a casing forming a substantially closed chamber, of a saw cylinder therein, a brush cylinder adapted to discharge lint downwardly from said saw cylinder, a flue for the lint leading from said casing on the side next to said brush cylinder, and a substantially straight mote board extending downwardly at an angle of about forty-five degrees from said flue to a point near the floor of the casing beneath the brush cylinder, the board being widely separated from said cylinder, and means for admitting air beneath said mote board.

In testimony whereof I affix my signature in presence of two witnesses.

HUGH E. SESSIONS.

Witnesses:
B. C. RUST,
A. E. T. HAUSMANN.